United States Patent
Zhao et al.

(10) Patent No.: US 10,344,559 B2
(45) Date of Patent: Jul. 9, 2019

(54) HIGH TEMPERATURE HIGH PRESSURE SEAL FOR DOWNHOLE CHEMICAL INJECTION APPLICATIONS

(71) Applicants: Lei Zhao, Houston, TX (US); Zhiyue Xu, Cypress, TX (US)

(72) Inventors: Lei Zhao, Houston, TX (US); Zhiyue Xu, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 403 days.

(21) Appl. No.: 15/164,969

(22) Filed: May 26, 2016

(65) Prior Publication Data

US 2017/0342802 A1    Nov. 30, 2017

(51) Int. Cl.
*C04B 35/52* (2006.01)
*E21B 34/10* (2006.01)
(Continued)

(52) U.S. Cl.
CPC .............. *E21B 34/10* (2013.01); *C04B 35/52* (2013.01); *C04B 35/522* (2013.01); *C04B 35/71* (2013.01);
(Continued)

(58) Field of Classification Search
CPC ....... C04B 35/522; C04B 35/71; C04B 35/52; C04B 2235/402; C04B 2235/40;
(Continued)

(56) References Cited

U.S. PATENT DOCUMENTS

| | | | |
|---|---|---|---|
| 3,246,369 A | 4/1966 | Rhoads et al. | |
| 3,521,853 A * | 7/1970 | Pennington | E21B 34/02 251/122 |

(Continued)

FOREIGN PATENT DOCUMENTS

| | | |
|---|---|---|
| CA | 2429780 A1 | 12/2003 |
| CN | 102775669 | 11/2012 |

(Continued)

OTHER PUBLICATIONS

Baxter et al., "Microstructure and solid particle erosion of carbon-based materials used for the protection of highly porous carbon-carbon composite thermal insulation", Journal of Materials Science, vol. 32, 1997, pp. 4485-4492.

(Continued)

*Primary Examiner* — Ian G Paquette
(74) *Attorney, Agent, or Firm* — Cantor Colburn LLP (57) ABSTRACT

An injection system comprises a fluid control member and a reciprocating member; wherein the fluid control member is configured to form a carbon composite-to-metal seal with the reciprocating member in response to application of a compressive force; the carbon composite comprising carbon and a binder containing one or more of the following: $SiO_2$; Si; B; $B_2O_3$; a filler metal; or an alloy of the filler metal, and the filler metal comprising one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

20 Claims, 6 Drawing Sheets

(51) Int. Cl.
  *C04B 35/71* (2006.01)
  *E21B 37/06* (2006.01)
(52) U.S. Cl.
  CPC ........... *C04B 2235/3409* (2013.01); *C04B 2235/3418* (2013.01); *C04B 2235/40* (2013.01); *C04B 2235/402* (2013.01); *C04B 2235/404* (2013.01); *C04B 2235/405* (2013.01); *C04B 2235/407* (2013.01); *C04B 2235/428* (2013.01); *E21B 37/06* (2013.01)
(58) Field of Classification Search
  CPC ...... C04B 2235/407; C04B 2235/3409; C04B 2235/428; C04B 2235/405; C04B 2235/404; C04B 2235/3418; E21B 34/10; E21B 37/06
  USPC .................................................. 251/120–122
  See application file for complete search history.

(56) References Cited

U.S. PATENT DOCUMENTS

| | | | |
|---|---|---|---|
| 3,561,770 A | 2/1971 | Corsi et al. | |
| 3,666,852 A | 5/1972 | Burke | |
| 3,807,996 A | 4/1974 | Sarah | |
| 3,904,405 A | 9/1975 | Russell et al. | |
| 3,956,568 A | 5/1976 | Kanemaru et al. | |
| 3,967,935 A | 7/1976 | Frehn | |
| 3,981,427 A | 9/1976 | Brookes | |
| 4,116,451 A | 9/1978 | Nixon et al. | |
| 4,205,858 A | 6/1980 | Shimazaki et al. | |
| 4,234,638 A | 11/1980 | Yamazoe et al. | |
| 4,269,391 A * | 5/1981 | Saito | F16J 15/30 251/315.03 |
| 4,270,569 A | 6/1981 | Reay et al. | |
| 4,358,506 A | 11/1982 | Intrater et al. | |
| 4,372,393 A | 2/1983 | Baker | |
| 4,383,970 A | 5/1983 | Komuro et al. | |
| 4,426,086 A | 1/1984 | Fournie et al. | |
| 4,567,103 A | 1/1986 | Sara | |
| 4,732,364 A * | 3/1988 | Seger | E21B 34/02 251/122 |
| 4,743,033 A | 5/1988 | Guess | |
| 4,780,226 A | 10/1988 | Sheets et al. | |
| 4,789,166 A | 12/1988 | Rericha et al. | |
| 4,798,771 A | 1/1989 | Vogel | |
| 4,799,956 A | 1/1989 | Vogel | |
| 4,826,181 A | 5/1989 | Howard et al. | |
| 4,885,218 A | 12/1989 | Andou et al. | |
| 5,117,913 A | 6/1992 | Thernig | |
| 5,134,030 A | 7/1992 | Ueda et al. | |
| 5,163,692 A | 11/1992 | Schofield et al. | |
| 5,195,583 A | 3/1993 | Toon et al. | |
| 5,201,532 A | 4/1993 | Salesky et al. | |
| 5,225,379 A | 7/1993 | Howard | |
| 5,228,701 A | 7/1993 | Greinke et al. | |
| 5,247,005 A | 9/1993 | Von Bonin et al. | |
| 5,257,603 A | 11/1993 | Bauer et al. | |
| 5,283,121 A | 2/1994 | Bordner | |
| 5,286,574 A | 2/1994 | Foster et al. | |
| 5,362,074 A | 11/1994 | Gallo et al. | |
| 5,392,982 A | 2/1995 | Li | |
| 5,455,000 A | 10/1995 | Seyferth et al. | |
| 5,467,814 A | 11/1995 | Hyman et al. | |
| 5,494,753 A | 2/1996 | Anthony | |
| 5,495,979 A | 3/1996 | Sastri et al. | |
| 5,499,827 A | 3/1996 | Suggs et al. | |
| 5,509,555 A | 4/1996 | Chiang et al. | |
| 5,522,603 A | 6/1996 | Naitou et al. | |
| 5,597,168 A | 1/1997 | Antonini | |
| 5,730,444 A | 3/1998 | Notter | |
| 5,765,838 A | 6/1998 | Ueda et al. | |
| 5,791,657 A | 8/1998 | Cain et al. | |
| 5,968,653 A | 10/1999 | Coppella et al. | |
| 5,976,437 A | 11/1999 | Marrocco, III et al. | |
| 5,988,202 A * | 11/1999 | Spitzer, Sr. | F16K 1/38 137/269 |
| 5,992,857 A | 11/1999 | Ueda et al. | |
| 6,020,276 A | 2/2000 | Roves et al. | |
| 6,027,809 A | 2/2000 | Ueda et al. | |
| 6,065,536 A | 5/2000 | Gudmestad et al. | |
| 6,075,701 A | 6/2000 | Ali et al. | |
| 6,105,596 A | 8/2000 | Hoyes et al. | |
| 6,128,874 A | 10/2000 | Olson et al. | |
| 6,131,651 A | 10/2000 | Richy, III | |
| 6,152,453 A | 11/2000 | Kashima et al. | |
| 6,161,838 A | 12/2000 | Balsells | |
| 6,182,974 B1 | 2/2001 | Harrelson | |
| 6,183,667 B1 | 2/2001 | Kubo et al. | |
| 6,234,490 B1 | 5/2001 | Champlin | |
| 6,258,457 B1 | 7/2001 | Ottinger et al. | |
| 6,273,431 B1 | 8/2001 | Webb | |
| 6,383,656 B1 | 5/2002 | Kimura et al. | |
| 6,506,482 B1 | 1/2003 | Burton et al. | |
| 6,581,682 B1 | 6/2003 | Parent et al. | |
| 6,585,053 B2 | 7/2003 | Coon et al. | |
| 6,789,634 B1 | 9/2004 | Denton | |
| 6,880,639 B2 | 4/2005 | Rhodes et al. | |
| 6,933,531 B1 | 8/2005 | Ishikawa et al. | |
| 7,105,115 B2 | 9/2006 | Shin | |
| 7,138,190 B2 | 11/2006 | Bauer et al. | |
| 7,470,468 B2 | 12/2008 | Mercuri et al. | |
| 7,666,469 B2 | 2/2010 | Weintritt et al. | |
| 7,758,783 B2 | 7/2010 | Shi et al. | |
| 8,604,157 B2 | 12/2013 | Gerrard et al. | |
| 8,929,119 B2 | 1/2015 | Lee et al. | |
| 8,939,222 B2 | 1/2015 | Ren et al. | |
| 9,120,898 B2 | 9/2015 | Ren et al. | |
| 9,144,925 B2 | 9/2015 | Ren et al. | |
| 9,325,012 B1 | 4/2016 | Xu et al. | |
| 9,822,894 B2 * | 11/2017 | Bayyouk | F16K 25/005 |
| 2001/0003389 A1 | 6/2001 | Pippert | |
| 2001/0039966 A1 | 11/2001 | Walpole et al. | |
| 2002/0114952 A1 | 8/2002 | Ottinger et al. | |
| 2002/0140180 A1 | 10/2002 | Waltenberg et al. | |
| 2003/0137112 A1 | 7/2003 | Richter et al. | |
| 2004/0026085 A1 | 2/2004 | Vacik et al. | |
| 2004/0097360 A1 | 5/2004 | Benitsch et al. | |
| 2004/0127621 A1 | 7/2004 | Drzal et al. | |
| 2004/0155382 A1 | 8/2004 | Huang et al. | |
| 2004/0186201 A1 | 9/2004 | Stoffer et al. | |
| 2005/0202245 A1 | 9/2005 | Mercuri et al. | |
| 2006/0042801 A1 | 3/2006 | Hackworth et al. | |
| 2006/0220320 A1 | 10/2006 | Potier et al. | |
| 2006/0249917 A1 | 11/2006 | Kosty | |
| 2006/0272321 A1 | 12/2006 | Mockenhaupt et al. | |
| 2006/0272806 A1 | 12/2006 | Wilkie et al. | |
| 2007/0009725 A1 | 1/2007 | Noguchi et al. | |
| 2007/0054121 A1 | 3/2007 | Weintritt et al. | |
| 2007/0142547 A1 | 6/2007 | Vaidya et al. | |
| 2007/0243407 A1 | 10/2007 | Delannay et al. | |
| 2007/0257405 A1 | 11/2007 | Freyer | |
| 2008/0128067 A1 | 6/2008 | Sayir et al. | |
| 2008/0152577 A1 | 6/2008 | Addiego et al. | |
| 2008/0175764 A1 | 7/2008 | Sako | |
| 2008/0279710 A1 | 11/2008 | Zhamu et al. | |
| 2008/0289813 A1 | 11/2008 | Gewily et al. | |
| 2009/0059474 A1 | 3/2009 | Zhamu et al. | |
| 2009/0075120 A1 | 3/2009 | Cornie et al. | |
| 2009/0151847 A1 | 6/2009 | Zhamu et al. | |
| 2009/0302552 A1 | 6/2009 | Leinfelder et al. | |
| 2009/0194205 A1 | 8/2009 | Loffler et al. | |
| 2010/0003530 A1 | 1/2010 | Ganguli et al. | |
| 2010/0098956 A1 | 4/2010 | Sepeur et al. | |
| 2010/0122821 A1 | 5/2010 | Corre et al. | |
| 2010/0143690 A1 | 6/2010 | Romero et al. | |
| 2010/0159357 A1 | 6/2010 | Otawa et al. | |
| 2010/0163782 A1 | 7/2010 | Chang et al. | |
| 2010/0203340 A1 | 8/2010 | Ruoff et al. | |
| 2010/0207055 A1 | 8/2010 | Ueno et al. | |
| 2010/0266790 A1 | 10/2010 | Kusinski et al. | |
| 2011/0033721 A1 | 2/2011 | Rohatgi | |
| 2011/0045724 A1 | 2/2011 | Bahukudumbi | |
| 2011/0140365 A1 | 6/2011 | Dietle et al. | |

(56) References Cited

U.S. PATENT DOCUMENTS

| | | |
|---|---|---|
| 2011/0157772 A1 | 6/2011 | Zhamu et al. |
| 2011/0187058 A1 | 8/2011 | Curry et al. |
| 2011/0200825 A1 | 8/2011 | Chakraborty et al. |
| 2012/0107590 A1 | 5/2012 | Xu et al. |
| 2012/0205873 A1 | 8/2012 | Turley |
| 2013/0001475 A1 | 1/2013 | Christ et al. |
| 2013/0114165 A1 | 5/2013 | Mosendz et al. |
| 2013/0192853 A1 | 8/2013 | Themig |
| 2013/0284737 A1 | 10/2013 | Ju et al. |
| 2013/0287326 A1 | 10/2013 | Porter et al. |
| 2013/0292138 A1 | 11/2013 | Givens et al. |
| 2014/0051612 A1 | 2/2014 | Mazyar et al. |
| 2014/0127526 A1 | 5/2014 | Etschmaier et al. |
| 2014/0224466 A1 | 8/2014 | Lin et al. |
| 2014/0272592 A1 | 9/2014 | Thompkins et al. |
| 2015/0027567 A1 | 1/2015 | Shreve et al. |
| 2015/0034316 A1 | 2/2015 | Hallundbäk et al. |
| 2015/0068774 A1 | 3/2015 | Hallundbäk et al. |
| 2015/0158773 A1 | 6/2015 | Zhao et al. |
| 2015/0267816 A1 | 9/2015 | Boskovski |
| 2016/0032671 A1 | 2/2016 | Xu et al. |
| 2016/0089648 A1 | 3/2016 | Xu et al. |
| 2016/0108703 A1 | 4/2016 | Xu et al. |
| 2016/0130519 A1 | 5/2016 | Lei et al. |
| 2016/0136923 A1 | 5/2016 | Zhao et al. |
| 2016/0136928 A1 | 5/2016 | Zhao et al. |
| 2016/0138359 A1 | 5/2016 | Zhao et al. |
| 2016/0145965 A1 | 5/2016 | Zhao et al. |
| 2016/0145966 A1 | 5/2016 | Zhao et al. |
| 2016/0145967 A1 | 5/2016 | Zhao et al. |
| 2016/0146350 A1 | 5/2016 | Zhao et al. |
| 2016/0160602 A1 | 6/2016 | Ruffo |
| 2016/0176764 A1 | 6/2016 | Xu et al. |
| 2016/0186031 A1 | 6/2016 | Zhao et al. |
| 2016/0333657 A1 | 11/2016 | Zhao et al. |
| 2017/0321069 A1 | 11/2017 | Zhao et al. |

FOREIGN PATENT DOCUMENTS

| | | |
|---|---|---|
| EP | 0067252 A1 | 12/1982 |
| EP | 0539011 A1 | 4/1993 |
| EP | 0747615 B1 | 10/2001 |
| EP | 2056004 A1 | 5/2009 |
| EP | 2586963 A1 | 5/2013 |
| JP | S5424910 A | 2/1979 |
| JP | S5491507 A | 7/1979 |
| JP | S58181713 A | 10/1983 |
| JP | S6131355 A | 2/1986 |
| JP | H0238365 A | 2/1990 |
| JP | H0616404 A | 1/1994 |
| JP | 2014141746 | 8/2014 |
| WO | 9403743 | 2/1994 |
| WO | 03102360 | 12/2003 |
| WO | 2004015150 A2 | 2/2004 |
| WO | 2005115944 | 12/2005 |
| WO | 2007138409 A1 | 12/2007 |
| WO | 2008021033 A2 | 2/2008 |
| WO | 2011039531 A1 | 4/2011 |
| WO | 2014028149 A1 | 2/2014 |
| WO | 2015021627 A1 | 2/2015 |
| WO | 2016053510 A1 | 4/2016 |

OTHER PUBLICATIONS

Etter et al., "Aluminium carbide formation in interpenetrating graphite/aluminium composites", Materials Science and Engineering, Mar. 15, 2007, vol. 448, No. 1, pp. 1-6.

Hutsch et al., "Innovative Metal-Graphite Composites as Thermally Conducting Materials", PM2010 World Congress—PM Functional Materials—Heat Sinks, 2010, 8 pages.

Levin et al., "Solid Particle Erosion Resistance and High Strain Rate Deformation Behavior of Inconel-625 Alloy", Superalloys 718, 625, 706 and Various Derivatives, The Minerals, Metals & Materials Society, 1997, 10 pages.

Miyamoto et al., "Development of New Composites; Ceramic Bonded Carbon", Transactions of JWRI, vol. 38, No. 2, 2009, pp. 57-61.

Moghadam et al, "Functional Metal Matrix Composites: Self-lubricating, Self-healing, and Nanocomposites—An Outlook", The Minerals, Metals & Materials Society, Apr. 5, 2014, 10 pages.

Pohlmann et al., "Magnesium alloy-graphite composites with tailored heat conduction properties for hydrogen storage applications", International Journal of Hydrogen Energy, 35 (2010), pp. 12829-12836.

Rashad et al. "Effect of of Graphene Nanoplatelets addition on mechanical properties of pure aluminum using a semi-powder method", Materials International, Apr. 20, 2014, vol. 24, pp. 101-108.

Tikhomirov et al., "The chemical vapor infiltration of exfoliated graphite to produce carbon/carbon composites", Carbon, 49 (2011), pp. 147-153.

Yang et al., "Effect of tungsten addition on thermal conductivity of graphite/copper composites", Composites Part B: Engineering, May 31, 2013, vol. 55, pp. 1-4.

International Search Report, International Application No. PCT/US2017/028761, dated Aug. 11, 2017, Korean Intellectual Property Office; International Search Report 3 pages.

International Written Opinion, International Application No. PCT/US2017/028761, dated Aug. 11, 2017, Korean Intellectual Property Office; International Written Opinion 11 pages.

Petitcorps et al. "Carbon Fibre Reinforced Copper Matrix Composites: Processing Routes and Properties", Key Engineering Materials, 1996, vols. 127-131, pp. 327-334.

Prieto et al. "Fabrication and properties of graphite flakes/metal composites for thermal management applications", Scripta Materialia 59 (2008) 11-14.

* cited by examiner

FIG. 11 ated, have low wear/impact resistance or have poor chemical stability to injection fluids. Thus, the art is receptive to alternative injection valves that have good pressure resistance, thermal resistance, and chemical resistance.

HIGH TEMPERATURE HIGH PRESSURE SEAL FOR DOWNHOLE CHEMICAL INJECTION APPLICATIONS

BACKGROUND

As offshore operators get into deeper waters and develop more mature oil and gas fields using more complex well architectures, downhole injection of chemicals is increasingly required to manage challenges such as scale formation or asphaltene precipitation within the wellbore. Typically chemicals are injected via a chemical injection system including an injection check valve. Because the injection valves are normally installed deep within the well, they are constantly subject to high temperatures and high pressures. The injection valves are also exposed to various chemicals having different chemical and physical characteristics. These harsh working conditions could cause leakage or total failure of an injection valve having a seal made of polymeric materials because polymeric materials may lose their mechanical strength at elevated temperatures, have low wear/impact resistance or have poor chemical stability to injection fluids. Thus, the art is receptive to alternative injection valves that have good pressure resistance, thermal resistance, and chemical resistance.

BRIEF DESCRIPTION

An injection system comprises a flow control member and a reciprocating member; wherein the fluid control member is configured to form a carbon composite-to-metal seal with the reciprocating member in response to application of a compressive force.

A method of injecting a chemical composition comprises injecting the chemical composition at a pressure sufficient to disengage a flow control member from a reciprocating member so that the chemical composition flows past the reciprocating member; reducing or eliminating the pressure of the chemical composition; engaging the flow control member with the reciprocating member to form a carbon composite-to-metal seal.

The carbon composite in the above injection valve system and the method comprises carbon and a binder containing one or more of the following: $SiO_2$; Si; B; $B_2O_3$; a filler metal; or an alloy of the filler metal, and the filler metal comprising one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

BRIEF DESCRIPTION OF THE DRAWINGS

The following descriptions should not be considered limiting in any way. With reference to the accompanying drawings, like elements are numbered alike.

DETAILED DESCRIPTION

The disclosure provides injection systems having improved mechanical strength and chemical resistance. Compared with injection systems containing elastomeric materials, the injection systems disclosed herein can have increased lifetime even when used in high pressure and high temperature environments.

An injection system comprises a fluid control member and a reciprocating member; wherein the fluid control member is configured to form a carbon composite-to-metal seal with the reciprocating member in response to application of a compressive force. Optionally the flow control member can also form a metal-to-metal seal with the reciprocating member.

Figure 1:
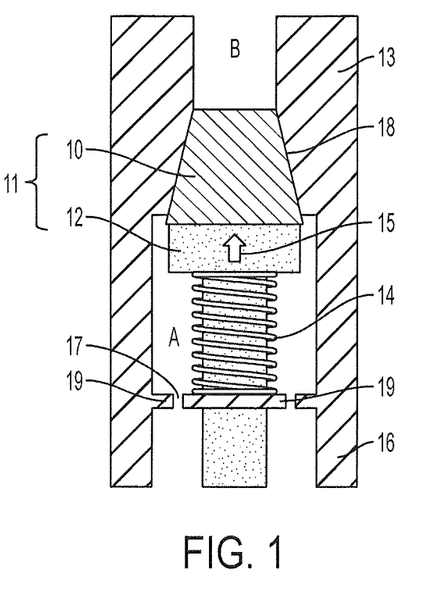
FIG. 1 depicts a partial cross-sectional view of an injection system in a closed position in accordance with an exemplary embodiment.

Referring to FIG. 1, an injection system comprises a flow control member 11 and a reciprocating member 13. The flow control member 11 has a carbon composite portion 10 and a metal portion 12. The reciprocating member 13 can be attached or fixed to a housing or tubing 16. The reciprocating member 13 can also be part of the housing or tubing 16.

As shown in FIG. 1, when a compressive force 15 is applied to the flow control member 11, the flow control member 11 forms a carbon composite-to-metal seal 18 with reciprocating member 13. The compressive force can be generated by a biasing member 14 disposed adjacent the flow control member 11. The biasing member 14 may take the form of a coil spring. The compressive force can also include the force generated by downhole pressures. The seal prevents hydrocarbon flow from side A to side B of the injection system. Side A of the injection system may be connected to downhole environments. Side B of the injection system can be connected to a chemical injection line (not shown). The system can include a retaining member 19 attached or fixed to housing or tubing 16. The retaining member 19 can also be part of the housing or tubing 16. The retaining member 19 is configured to keep the biasing member 14 in place when the biasing member 14 is pressed while at the same time the retaining member 19 allows the fluid control member to move 11 when it is subjected to a force. The retaining member 19 has one or more openings to allow fluids to pass through.

Chemical compositions can be delivered from an injection line which leads to a remote location such as a surface location or other downhole location, and has access to a supply of chemicals for injection. Different chemicals are utilized at different times for different reasons, each of which can be sent down the chemical injection line. The injection system is configured to allow a chemical composition such as a fluid to flow pass the reciprocating member when the fluid control member is disengaged with the reciprocating member.

Figure 2:
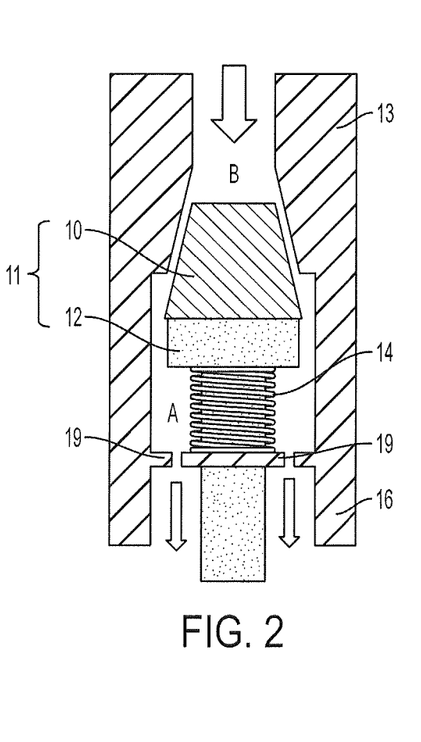
FIG. 2 depicts a partial cross-sectional view of the injection system of FIG. 1 in an open position.

Referring to FIG. 2, once inside the injection system, the pressure of the chemical composition urges the fluid control member 11 away from the reciprocating member 13. When the pressure of the chemical composition is greater than the opposing force exerted on the fluid control member 11, the fluid control member moves away from the reciprocating member 13 allowing the chemical composition to flow past the reciprocating member 13 and enter side A of the injection system.

Figure 3:
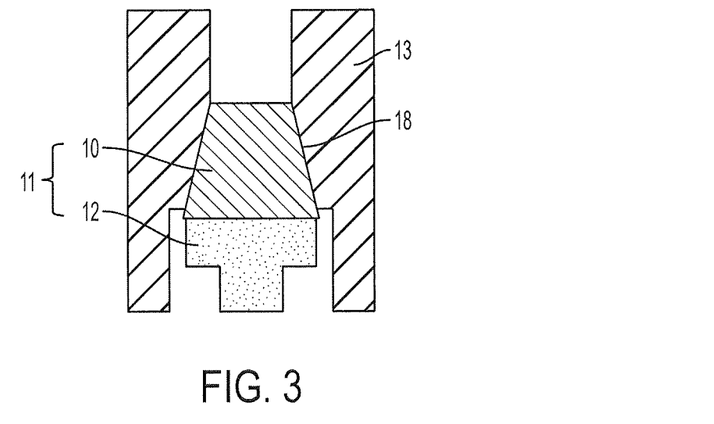
FIG. 3 depicts a partial cross-sectional view of an injection system in accordance with an exemplary embodiment.

FIGS. 3-7 depict partial cross-sectional views of injection systems according to various exemplary embodiments of the disclosure. In FIG. 3, the flow control member 11 has a carbon composite portion 10 and a metal portion 12, wherein the carbon composite portion has a tapered surface. In the flow control member, a binding layer (not shown) is optionally present between the carbon composite portion and the metal portion.

Figure 4:
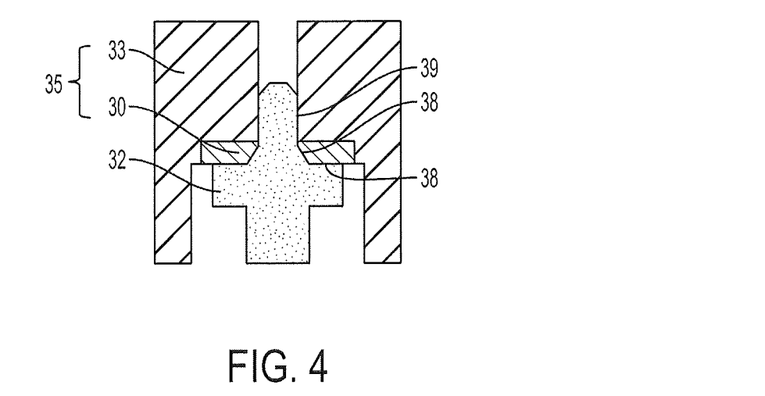
FIG. 4 depicts a partial cross-sectional view of an injection system in a closed position in accordance with another exemplary embodiment.

Referring to FIG. 4, the fluid control member 32 is a metal part, and the reciprocating member 35 has a carbon composite portion 30 and a metal portion 33. The carbon composite portion 30 and the metal portion 33 of the reciprocating member 35 form a seal with the flow control member 32. The seal includes a carbon composite-to-metal seal 38 and a metal-to-metal seal 39.

Figure 5:
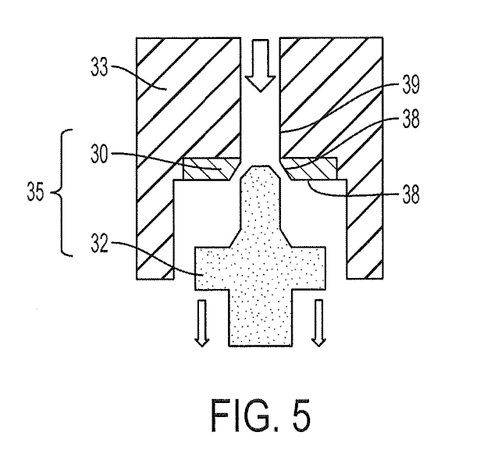
FIG. 5 depicts a partial cross-sectional view of the injection system of FIG. 4 in an open position.

FIG. 5 shows the injection system of FIG. 4 in an open position. As shown in FIG. 5, under sufficient pressure, the fluid control member 32 moves away from the reciprocating member 35 allowing chemical compositions flow through the reciprocating member 35.

Figure 6:
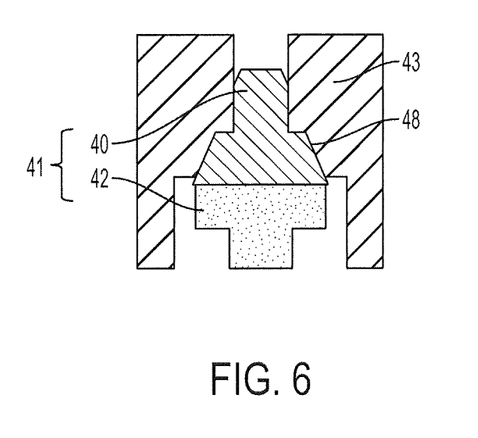
FIG. 6 depicts a partial side-view of an injection system in accordance with yet another exemplary embodiment.

Referring to FIG. 6, the flow control member 41 comprises a carbon composite portion 40 and a metal portion 42. The carbon composite portion 40 forms a carbon composite-to-metal seal 48 with the reciprocating member 43.

Figure 7:
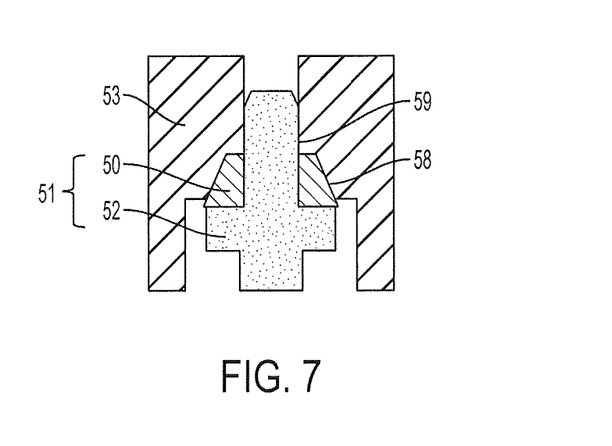
FIG. 7 depicts a partial side-view of an injection system in accordance with still another exemplary embodiment.

Referring to FIG. 7, the flow control member 51 comprises a carbon composite portion 50 and a metal portion 52. The carbon composite portion 50 of the flow control member 51 can form a carbon composite-to-metal seal 58 with the reciprocating member 53, and the metal portion 52 of the flow control member 51 can form a metal-to-metal seal 59 with the reciprocating member 53.

The injection system can be installed on downhole production tubing string. More than one injection systems can be used. To address scale, wax, asphaltene, or other issues, various chemicals of different compositions and properties can be injected. The materials used for the flow control member and the reciprocating member can be customized according to the characteristics of the injected chemicals. Illustratively, CuNi alloy, stainless steels, Inconel alloy and the like can be used as a material for the reciprocating member, the fluid flow control member, or the metal portion of the reciprocating member or the fluid control member when used for less corrosive water based chemical solution, including but not limited to phosphonates, surfactants, and polyacrylamides. Highly corrosion resistant metals or metal alloys such as Ni, Ti, Mo, Ag, Au, or alloys thereof, ceramics such as BN, BC, SiC, $SiO_2$ and the like can be used as the material for the reciprocating member, the fluid control member, or the metal portion of the reciprocating member or the fluid control member.

Carbon composites used in the flow control member or the reciprocating member contain carbon and an inorganic binder. The carbon can be graphite. As used herein, graphite includes one or more of natural graphite; synthetic graphite; expandable graphite; or expanded graphite. Natural graphite is graphite formed by Nature. It can be classified as "flake" graphite, "vein" graphite, and "amorphous" graphite. Synthetic graphite is a manufactured product made from carbon materials. Pyrolytic graphite is one form of the synthetic graphite. Expandable graphite refers to graphite having intercallant materials inserted between layers of natural graphite or synthetic graphite. A wide variety of chemicals have been used to intercalate graphite materials. These include acids, oxidants, halides, or the like. Exemplary intercallant materials include sulfuric acid, nitric acid, chromic acid, boric acid, $SO_3$, or halides such as $FeCl_3$, $ZnCl_2$, and $SbCl_5$. Upon heating, the intercallant is converted from a liquid or solid state to a gas phase. Gas formation generates pressure which pushes adjacent carbon layers apart resulting in expanded graphite. The expanded graphite particles are vermiform in appearance, and are therefore commonly referred to as worms.

In an embodiment, the carbon composites comprise carbon microstructures having interstitial spaces among the carbon microstructures; wherein the binder is disposed in at least some of the interstitial spaces. In an embodiment, the carbon microstructures comprise unfilled voids within the carbon microstructures. In another embodiment, both the interstitial spaces among the carbon microstructures and the voids within the carbon microstructures are filled with the binder or a derivative thereof.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can also be referred to as micro-flakes, micro-discs and the like. In an embodiment, the carbon microstructures are substantially parallel to each other.

There are two types of voids in the carbon composites—voids or interstitial spaces among carbon microstructures and voids within each individual carbon microstructures. The interstitial spaces among the carbon microstructures have a size of about 0.1 to about 100 microns, specifically about 1 to about 20 microns whereas the voids within the carbon microstructures are much smaller and are generally between about 20 nanometers to about 1 micron, specifically about 200 nanometers to about 1 micron. The shape of the voids or interstitial spaces is not particularly limited. As used herein, the size of the voids or interstitial spaces refers to the largest dimension of the voids or interstitial spaces and can be determined by high resolution electron or atomic force microscope technology.

The interstitial spaces among the carbon microstructures are filled with a micro- or nano-sized binder. For example, a binder can occupy about 10% to about 90% of the interstitial spaces among the carbon microstructures. In an embodiment, the binder does not penetrate the individual carbon microstructures and the voids within the carbon microstructures are unfilled, i.e., not filled with any binder. Thus the carbon layers within the carbon microstructures are not locked together by a binder. Through this mechanism, the flexibility of the carbon composites, particularly, expanded carbon composites can be preserved. In another embodiment, to achieve high strength, the voids within the carbon microstructures are filled with the binder or a derivative thereof. Methods to fill the voids within the carbon microstructures include vapor deposition.

The carbon microstructures have a thickness of about 1 to about 200 microns, about 1 to about 150 microns, about 1 to about 100 microns, about 1 to about 50 microns, or about 10 to about 20 microns. The diameter or largest dimension of the carbon microstructures is about 5 to about 500 microns or about 10 to about 500 microns. The aspect ratio of the carbon microstructures can be about 10 to about 500, about 20 to about 400, or about 25 to about 350. In an embodiment, the distance between the carbon layers in the carbon microstructures is about 0.3 nanometers to about 1 micron. The carbon microstructures can have a density of about 0.5 to about 3 g/cm$^3$, or about 0.1 to about 2 g/cm$^3$.

In the carbon composites, the carbon microstructures are held together by a binding phase. The binding phase comprises a binder which binds carbon microstructures by mechanical interlocking. Optionally, an interface layer is formed between the binder and the carbon microstructures. The interface layer can comprise chemical bonds, solid solutions, or a combination thereof. When present, the chemical bonds, solid solutions, or a combination thereof may strengthen the interlocking of the carbon microstructures. It is appreciated that the carbon microstructures may be held together by both mechanical interlocking and chemical bonding. For example the chemical bonding, solid solution, or a combination thereof may be formed between some carbon microstructures and the binder or for a particular carbon microstructure only between a portion of the carbon on the surface of the carbon microstructure and the binder. For the carbon microstructures or portions of the carbon microstructures that do not form a chemical bond, solid solution, or a combination thereof, the carbon microstructures can be bound by mechanical interlocking. The thickness of the binding phase is about 0.1 to about 100 microns or about 1 to about 20 microns. The binding phase can form a continuous or discontinuous network that binds carbon microstructures together.

Exemplary binders include a nonmetal, a metal, an alloy, or a combination comprising at least one of the foregoing. The nonmetal is one or more of the following: SiO$_2$; Si; B; or B$_2$O$_3$. The metal can be at least one of aluminum; copper; titanium; nickel; tungsten; chromium; iron; manganese; zirconium; hafnium; vanadium; niobium; molybdenum; tin; bismuth; antimony; lead; cadmium; or selenium. The alloy includes one or more of the following: aluminum alloys; copper alloys; titanium alloys; nickel alloys; tungsten alloys; chromium alloys; iron alloys; manganese alloys; zirconium alloys; hafnium alloys; vanadium alloys; niobium alloys; molybdenum alloys; tin alloys; bismuth alloys; antimony alloys; lead alloys; cadmium alloys; or selenium alloys. In an embodiment, the binder comprises one or more of the following: copper; nickel; chromium; iron; titanium; an alloy of copper; an alloy of nickel; an alloy of chromium; an alloy of iron; or an alloy of titanium. Exemplary alloys include steel, nickel-chromium based alloys such as INCONEL, and nickel-copper based alloys such as Monel alloys. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. These materials can be in different shapes, such as particles, fibers, and wires. Combinations of the materials can be used. The composition of the binders can be tailored according to the characteristics of the injected chemicals.

The binder used to make the carbon composites can be micro- or nano-sized. In an embodiment, the binder has an average particle size of about 0.05 to about 250 microns, about 0.05 to about 50 microns, about 1 micron to about 40 microns, specifically, about 0.5 to about 5 microns, more specifically about 0.1 to about 3 microns. Without wishing to be bound by theory, it is believed that when the binder has a size within these ranges, it disperses uniformly among the carbon microstructures.

Figure 11:
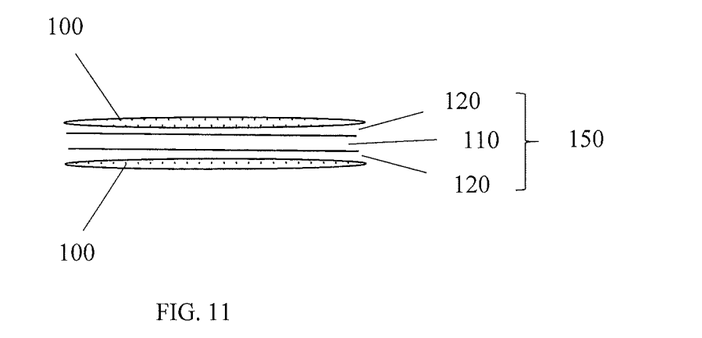
FIG. 11 illustrates an example of a carbon composite.

As shown in FIG. 11, when an interface layer is present, the binding phase (150) comprises a binder layer (110) comprising a binder and an interface layer (120A, 120B) bonding one of the at least two carbon microstructures (100A, 100B) to the binder layer (110). In an embodiment, the binding phase (150) comprises a binder layer (110), a first interface layer (120A) bonding one of the carbon microstructures (100A) to the binder layer (110), and a second interface layer (120B) bonding the other of the microstructures (100B) to the binder layer (110). The first interface layer and the second interface layer can have the same or different compositions.

The interface layer comprises one or more of the following: a C-metal bond; a C—B bond; a C—Si bond; a C—O—Si bond; a C—O-metal bond; or a metal carbon solution. The bonds are formed from the carbon on the surface of the carbon microstructures and the binder.

In an embodiment, the interface layer comprises carbides of the binder. The carbides include one or more of the following: carbides of aluminum; carbides of titanium; carbides of nickel; carbides of tungsten; carbides of chromium; carbides of iron; carbides of manganese; carbides of zirconium; carbides of hafnium; carbides of vanadium; carbides of niobium; or carbides of molybdenum. These carbides are formed by reacting the corresponding metal or metal alloy binder with the carbon atoms of the carbon microstructures. The binding phase can also comprise SiC formed by reacting SiO$_2$ or Si with the carbon of carbon microstructures, or B$_4$C formed by reacting B or B$_2$O$_3$ with the carbon of the carbon microstructures. When a combination of binder materials is used, the interface layer can comprise a combination of these carbides. The carbides can be salt-like carbides such as aluminum carbide, covalent carbides such as SiC and B$_4$C, interstitial carbides such as carbides of the group 4, 5, and 6 transition metals, or intermediate transition metal carbides, for example the carbides of Cr, Mn, Fe, Co, and Ni.

In another embodiment, the interface layer comprises a solid solution of carbon such as graphite and a binder. Carbon has solubility in certain metal matrix or at certain temperature ranges, which can facilitate both wetting and binding of a metal phase onto the carbon microstructures. Through heat-treatment, high solubility of carbon in metal can be maintained at low temperatures. These metals include one or more of Co; Fe; La; Mn; Ni; or Cu. The binder layer can also comprise a combination of solid solutions and carbides.

The carbon composites comprise about 20 to about 95 wt. %, about 20 to about 80 wt. %, or about 50 to about 80 wt. % of carbon, based on the total weight of the carbon composites. The binder is present in an amount of about 5 wt. % to about 75 wt. % or about 20 wt. % to about 50 wt. %, based on the total weight of the carbon composites. In the carbon composites, the weight ratio of carbon relative to the binder is about 1:4 to about 20:1, or about 1:4 to about 4:1, or about 1:1 to about 4:1.

Carbon composites can be manufactured by methods described in U.S. Publication No. 2016/0089648.

To further improve the mechanical properties of the flow control member and the reciprocating member, the carbon composites can further comprise a reinforcing element.

Exemplary reinforcing element comprises one or more of the following: a metal; a carbide; ceramics; or glass. The form of the reinforcing element is not limited and can include a powder, a fiber, a mesh, a filament, a brad, or a mat. The reinforcing agent can be present in an amount of about 0.01 wt. % to about 20 wt. % or about 1 wt. % to about 10 wt. % based on the total weight of the carbon composite. The reinforcing agent can be distributed uniformly throughout the carbon composite portion of the fluid control member or the reciprocating member. Alternatively, the reinforcing agent can have a gradient distribution with the surface of the carbon composite portion having a greater concentration of the reinforcing element than an inner portion to provide improved wear resistance, corrosion resistance, and hardness.

When a fluid control member or a reciprocating member has a metal portion and a carbon composite portion, the metal portion and the carbon composite portion can be joined by welding or brazing. The fluid control member or the reciprocating can also be made by molding, sintering, hot pressing, one step molding and sintering processes.

Figure 8:
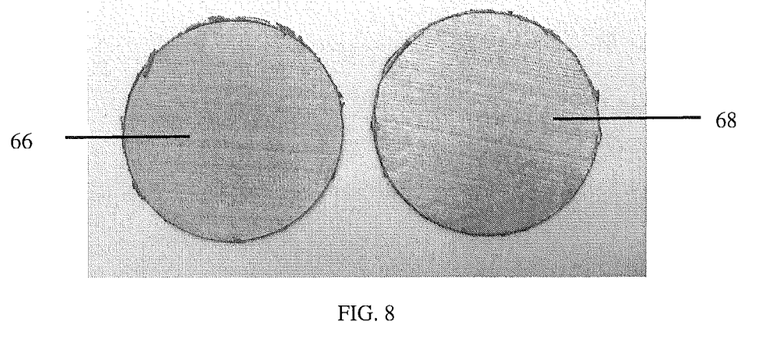
FIG. 8 is a photo image of a carbon composite sample and a reinforced carbon composite sample before a stress cycle test.
Figure 9:
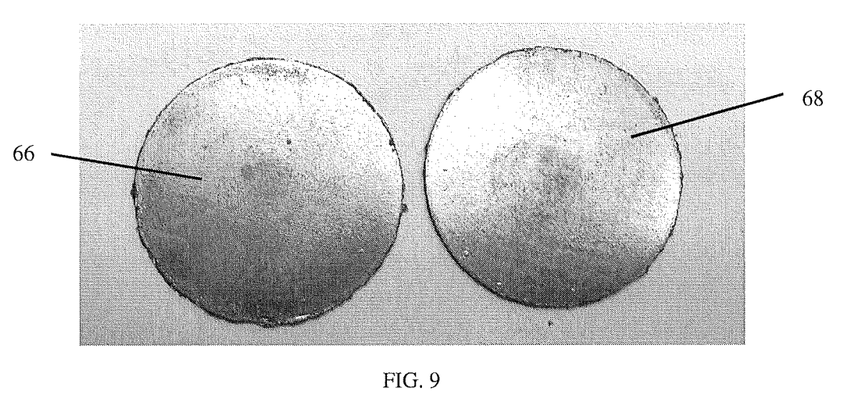
FIG. 9 is a photo image of the carbon composite sample and the reinforced carbon composite sample of FIG. 8 after a stress cycle test.
Figure 10:
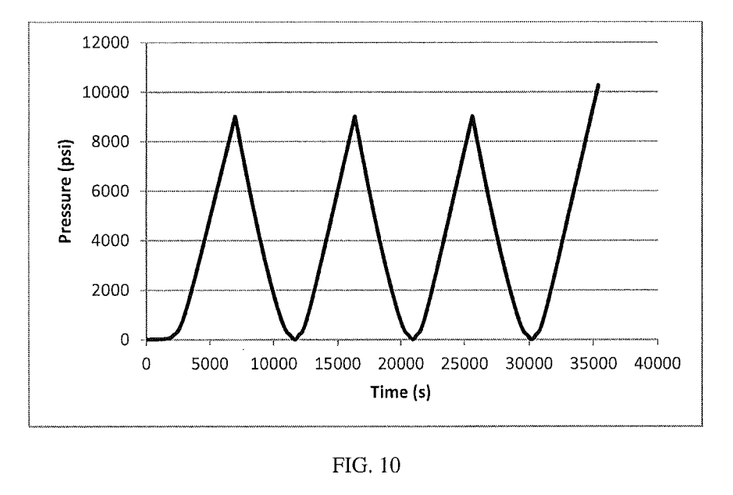
FIG. 10 shows the conditions for the stress cycle test.

The carbon composite portion of the fluid control member or the reciprocating member can have improved mechanical strength. FIG. 8 is a photo image of a carbon composite sample 66 and a reinforced carbon composite sample 68 before a stress cycle test; and FIG. 9 is a photo image of the carbon composite sample 66 and the reinforced carbon composite sample 68 after a stress cycle test under conditions shown in FIG. 10. A comparison of FIG. 8 with FIG. 9 indicates that no significant changes are observed after subjecting the carbon composite or the reinforced carbon composite sample to a pressure of up to 9000 psi for at least three testing cycles.

A method of injecting a chemical composition comprises injecting the chemical composition at a pressure sufficient to disengage a flow control member from a reciprocating member so that the chemical flows past the reciprocating member; reducing or eliminating the pressure of the chemical composition; engaging the flow control member with the reciprocating member to form a carbon composite-to-metal seal.

All ranges disclosed herein are inclusive of the endpoints, and the endpoints are independently combinable with each other. "Or" means "and/or." All references are incorporated herein by reference.

Set forth below are some embodiments of the foregoing disclosure:

Embodiment 1

An injection system comprising a fluid control member; and a reciprocating member; wherein the fluid control member is configured to form a carbon composite-to-metal seal with the reciprocating member in response to application of a compressive force; the carbon composite comprising carbon and a binder containing one or more of the following: SiO2; Si; B; B2O3; a filler metal; or an alloy of the filler metal, and the filler metal comprising one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

Embodiment 2

The injection system of Embodiment 1, wherein the system is configured to allow a fluid to flow pass the reciprocating member when the fluid control member is disengaged with the reciprocating member.

Embodiment 3

The injection system of Embodiment 1 or Embodiment 2, wherein the fluid control member comprises a carbon composite portion and a metal portion, and the carbon composite portion forms the carbon composite-to-metal seal with the reciprocating member.

Embodiment 4

The injection system of Embodiment 3, wherein a binding layer is present between the carbon composite portion and the metal portion of the fluid control member.

Embodiment 5

The injection system of Embodiment 3 or Embodiment 4, wherein the carbon composite portion has a tapered surface.

Embodiment 6

The injection system of any one of Embodiments 1 to 5, wherein the carbon composite member and the reciprocating member further form a metal-to-metal seal.

Embodiment 7

The injection system of Embodiment 6, wherein the flow control member comprises a carbon composite portion and a metal portion, the carbon composite portion of the flow control member forms a carbon composite-to-metal seal with the reciprocating member, and the metal portion of the flow control member forms a metal-to-metal seal with the reciprocating member.

Embodiment 8

The injection system of Embodiment 6, wherein the flow control member is a metal part, and the reciprocating member comprises a carbon composite portion and a metal portion, the carbon composite portion and the metal portion of the reciprocating member forming a seal with the flow control member.

Embodiment 9

The injection system of any one of Embodiments 1 to 8, further comprising a biasing member positioned adjacent the flow control member.

Embodiment 10

The injection system of any one of Embodiments 1 to 9, wherein the carbon composite comprises at least two carbon microstructures; and a binding phase disposed between the at least two carbon microstructures.

Embodiment 11

The injection system of Embodiment 10, wherein the binding phase comprises a binder layer and an interface layer bonding one of the at least two carbon microstructures to the binder layer, wherein the interface layer comprises one or more of the following: a C-metal bond; a C—B bond; a C—Si bond; a C—O—Si bond; a C—O-metal bond; or a metal carbon solution.

Embodiment 12

The injection system of Embodiment 10 or Embodiment 11, wherein the carbon comprises graphite.

Embodiment 13

The injection system of any one of Embodiments 10 to 12, wherein the carbon composite further comprises a reinforcing element.

Embodiment 14

The injection system of Embodiment 13, wherein the reinforcing element is in the form of a powder, a fiber, a mesh, a filament, a brad, or a mat.

Embodiment 15

The injection system of Embodiment 13 or Embodiment 14, wherein the reinforcing element comprises one or more of the following: a metal; a carbide; ceramics; or glass.

Embodiment 16

A method of injecting a chemical composition, the method comprising injecting the chemical composition at a pressure sufficient to disengage a flow control member from a reciprocating member so that the chemical composition flows past the reciprocating member; reducing or eliminating the pressure of the chemical composition; engaging the flow control member with the reciprocating member to form a carbon composite-to-metal seal; the carbon composite comprising carbon and a binder containing one or more of the following: SiO2; Si; B; B2O3; a filler metal; or an alloy of the filler metal, and the filler metal comprising one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

Embodiment 17

The method of Embodiment 16, wherein engaging the flow control member with the reciprocating member comprises applying a force to the flow control member via a biasing member disposed adjacent the flow control member.

Embodiment 18

The method of Embodiment 16 or Embodiment 17, wherein the flow control member comprises a carbon composite portion and a metal portion, and the carbon composite portion forms the carbon composite-to-metal seal with the reciprocating member.

Embodiment 19

The method of Embodiments 16 or Embodiment 17, wherein the flow control member and the reciprocating member further form a metal-to-metal seal.

Embodiment 20

The method of Embodiment 16 or Embodiment 17, wherein the fluid control member is a metal part, and the reciprocating member comprises a carbon composite portion and a metal portion, the carbon composite portion and the metal portion of the reciprocating member forming a seal with the fluid control member.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An injection system comprising:
   a fluid control member; and
   a reciprocating member;
   wherein the fluid control member is configured to form a carbon composite-to-metal seal with the reciprocating member in response to application of a compressive force;
   the carbon composite comprising at least two carbon microstructures; and a binding phase disposed between the at least two carbon microstructures, the carbon microstructures having an aspect ratio of about 10 to about 500 and a thickness of about 1 to about 200 microns, the binding phase comprising a binder, the binder contains one or more of the following: $SiO_2$; Si; B; $B_2O_3$; a binder metal; or an alloy of the binder metal, and
   the binder metal comprising one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

2. The injection system of claim 1, wherein the system is configured to allow a fluid to flow pass the reciprocating member when the fluid control member is disengaged with the reciprocating member.

3. The injection system of claim 1, further comprising a biasing member positioned adjacent the flow control member.

4. The injection system of claim 1, wherein the binding phase comprises
   a binder layer that comprises the binder; and
   an interface layer bonding one of the at least two carbon microstructures to the binder layer,
   the interface layer comprising one or more of the following: a C-metal bond; a C—B bond; a C—Si bond; a C—O—Si bond; a C—O-metal bond; or a metal carbon solution.

5. The injection system of claim 1, wherein the carbon structures comprises graphite carbon structures.

6. The method of claim 1, wherein the binding phase has a thickness of about 0.1 to about 100 microns.

7. The method of claim 1, wherein the binding phase has thickness of about 1 to about 20 microns.

8. The injection system of claim 1, wherein
the fluid control member comprises a carbon composite portion and a metal portion, and the carbon composite portion forms the carbon composite-to-metal seal with the reciprocating member.

9. The injection system of claim 8, wherein the carbon composite portion has a tapered surface.

10. The injection system of claim 1, wherein the carbon composite member and the reciprocating member further form a metal-to-metal seal.

11. The injection system of claim 10, wherein
the flow control member comprises a carbon composite portion and a metal portion,
the carbon composite portion of the flow control member forms a carbon composite-to-metal seal with the reciprocating member, and
the metal portion of the flow control member forms a metal-to-metal seal with the reciprocating member.

12. The injection system of claim 10, wherein
the flow control member is a metal part, and
the reciprocating member comprises a carbon composite portion and a metal portion,
the carbon composite portion and the metal portion of the reciprocating member forming a seal with the flow control member.

13. The injection system of claim 1 wherein the carbon composite further comprises a reinforcing element.

14. The injection system of claim 13, wherein the reinforcing element is in the form of a powder, a fiber, a mesh, a filament, a brad, or a mat.

15. The injection system of claim 13, wherein the reinforcing element comprises one or more of the following: a metal; a carbide; ceramics; or glass.

16. A method of injecting a chemical composition, the method comprising
injecting the chemical composition at a pressure sufficient to disengage a flow control member from a reciprocating member so that the chemical composition flows past the reciprocating member;
reducing or eliminating the pressure of the chemical composition;
engaging the flow control member with the reciprocating member to form a carbon composite-to-metal seal;
the carbon composite comprising at least two carbon microstructures, and a binding phase disposed between the at least two carbon microstructures, the carbon microstructures having an aspect ratio of about 10 to about 500 and a thickness of about 1 to about 200 microns, the binding phase comprising a binder, the binder one or more of the following: $SiO_2$; Si; B; $B_2O_3$; a binder metal; or an alloy of the binder metal, and
the binder metal comprising one or more of the following: aluminum;
copper; titanium; nickel; tungsten; chromium; iron; manganese; zirconium; hafnium;
vanadium; niobium; molybdenum; tin; bismuth; antimony; lead; cadmium; or selenium.

17. The method of claim 16, wherein engaging the flow control member with the reciprocating member comprises applying a force to the flow control member via a biasing member disposed adjacent the flow control member.

18. The method of claim 16, wherein the flow control member comprises a carbon composite portion and a metal portion, and the carbon composite portion forms the carbon composite-to-metal seal with the reciprocating member.

19. The method of claim 16, wherein the flow control member and the reciprocating member further form a metal-to-metal seal.

20. The method of claim 16, wherein
the fluid control member is a metal part, and
the reciprocating member comprises a carbon composite portion and a metal portion,
the carbon composite portion and the metal portion of the reciprocating member forming a seal with the fluid control member.

* * * * *